Oct. 30, 1945.  W. LOWN ET AL  2,387,851
GOGGLES
Filed Feb. 3, 1942  2 Sheets-Sheet 1

INVENTOR.
Walter Lown and
BY Charles A. Baratelli
Donald R. Brown
Attorney

Oct. 30, 1945. W. LOWN ET AL 2,387,851
GOGGLES
Filed Feb. 3, 1942 2 Sheets-Sheet 2
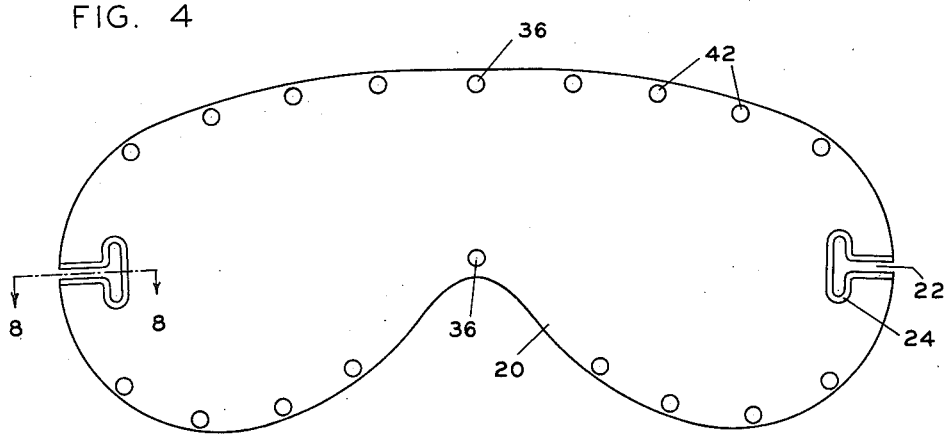
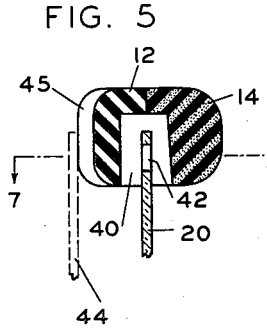
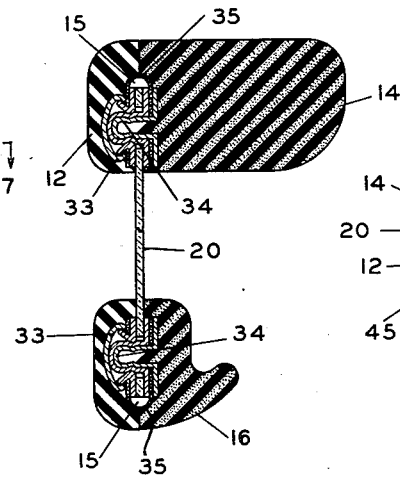
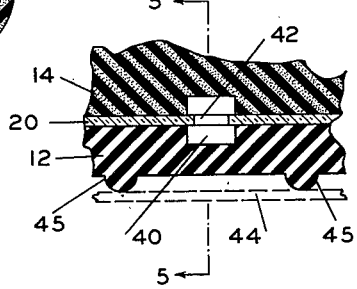
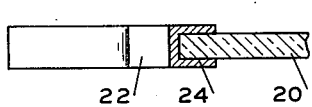
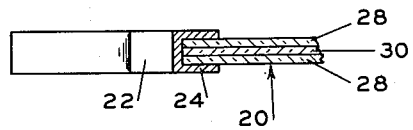
Walter Lown
and
Charles A. Baratelli
INVENTORS
BY Donald L. Brown
Attorney Patented Oct. 30, 1945

2,387,851

UNITED STATES PATENT OFFICE 2,387,851

GOGGLES

Walter Lown, Boston, and Charles A. Baratelli, Cambridge, Mass., assignors, by mesne assignments, to American Optical Company, Southbridge, Mass., a voluntary association of Massachusetts Application February 3, 1942, Serial No. 429,395

9 Claims. (Cl. 2—14)

This invention relates to goggles, particularly to the type of goggles designed to protect the wearer's eyes against wind.

It is one object of the invention to provide gogges of this type which have lenses formed of light-transmitting, plastic material, and preferably from a single sheet of such plastic material.

Another object of the invention is to provide goggles of the above type wherein the lens comprises a blank formed from light-polarizing, plastic material, and which will accordingly protect the wearer's eyes against glare as well as against wind.

A further object is to provide goggles of the above type in the form of a simple frame of rubber or the like, which is simple to manufacture and wherein the plastic lens sheet may be readily mounted or exchanged.

A still further object is to provide such goggles whereto an auxiliary lens sheet may be quickly added if desired, as for example a goggle equipped with a clear lens blank which may be quickly fitted with a light-polarizing lens blank to protect the wearer's eyes against glare.

A still further object is to provide an improved plastic lens in the form of a sheet-like blank of light-polarizing plastic material adapted for use in the goggle frame of the invention.

Other objects and advantages will in part appear and in part be pointed out in the course of the following detailed description of one embodiment of the invention, which is given as a non-limiting example, in connection with the accompanying drawings, in which:

Fig. 4 is an elevation of the novel lens blank of the invention;

Fig. 5 is an enlarged fragmentary sectional view through one of the vent holes of the goggle frame shown in Fig. 1, and taken approximately on the line 5—5 in Fig. 7;

Fig. 6 is an enlarged fragmentary view similar to Fig. 2;

Fig. 7 is an enlarged fragmentary sectional view taken on approximately the line 7—7 in Fig. 5;

Fig. 8 is an enlarged fragmentary sectional view taken on the line 8—8 in Fig. 4; and Fig. 9 is a view similar to Fig. 8, showing a modified form of the novel lens blank of the invention comprising light-polarizing material.

Figure 1:
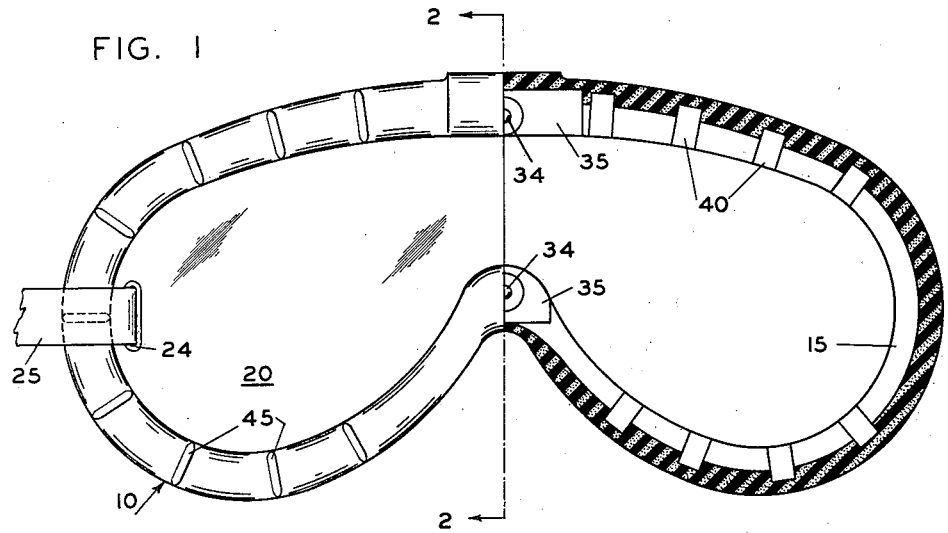
Figure 1 is a front view, partly in section substantially along a line in the plane of the lens, of a pair of goggles constituting an embodiment of the invention.

In the drawings, main frame or body 10 of the goggles is formed of a relatively soft material, such for example as rubber. It has been found desirable to form frame 10 of two sections 12 and 14 vulcanized or otherwise secured together along the outer portion of their contacting areas but separated in the inner portion to form a lens-receiving groove 15. Front portion 12 is preferably formed of relatively rigid rubber material, and the rear or face engaging portion 14 is formed of sponge rubber or similarly soft material. As is shown particularly in Figs. 2 and 6, frame 10 is suitably curved and beveled at 16 to accommodate the nose of the wearer. Similarly, portion 14 of the frame is extended at each end into a curved, beveled portion 18 adapted to fit smoothly around the eyes and temples of the wearer.

Figure 3:
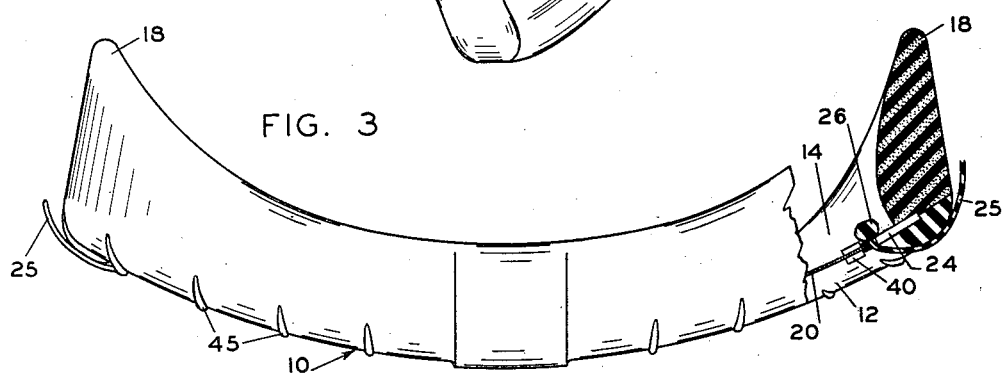
Fig. 3 is a top view, partly in section and partly broken away, of the goggle shown in Fig. 1.

Lens 20 of the goggle of the invention preferably comprises a single sheet-like blank of transparent plastic material having its periphery formed in substantially the same outline as that of frame element 10, and is adapted to fit easily within groove 15 in the goggle frame. Lens blank 20 is provided at each end with a T-slot 22 suitably lined with a grommet 24 of metal or other suitable material, said slots being adapted to receive head-engaging strap 25 which may be formed of rubber or any other suitable material. As is shown particularly in Fig. 3, strap 25 is provided at its inner ends with a conveniently formed lug or bead member 26 adapted to secure it to lens sheet 20. The construction of slots 22 and grommets 24 is shown more clearly in the enlarged views in Figs. 8 and 9. Beads 26 will preferably be of such shape as to fit closely with grommets 24 and substantially seal slots 22 against the passage of light therethrough.

Lens blank 20 may comprise any desired light-transmitting plastic of sufficient rigidity and flexibility, such for example as cellulose acetate, cellulose nitrate or cellulose acetate butyrate. It may be uniformly transparent or may have any desired dye incorporated therewith. In the preferred embodiment of the invention, blank 20 will comprise light-polarizing material and may be formed, for example as shown in Fig. 9, by laminating between two layers 28 of material such as cellulose acetate a layer 30 of light-polarizing material, such for example as any of the light-polarizing materials sold under the trade name "Polaroid." Furthermore, it is preferred that blank 20 be so formed and positioned with respect to the polarizing axis of layer 30 that it will transmit only light vibrating in substantially vertical planes.

Figure 2:
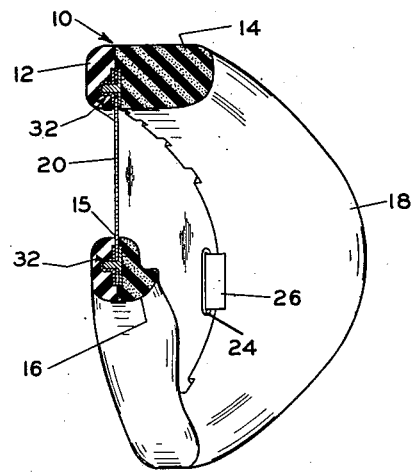
Fig. 2 is a section on the line 2—2 in Fig. 1.

Figs. 2 and 6 illustrate a novel and convenient way of securing lens blank 20 within goggle frame 10. As shown in Fig. 2, frame 10 is provided within groove 15 with a plurality of snap fasteners 32. As shown in more detail in Fig. 6, one member 33 of each of said fasteners 32 is carried by frame portion 12, and the other fasteners member 34 by frame portion 14. Any desired number of fasteners 32 may be used, but it has been found that satisfactory results are obtained by the use of two, as shown. They may be mounted in the frame in any desired way, but it has been found particularly convenient to mount each element of a fastener in a strip of rubberized cloth or similar material 35, and then to mold strip 35 with its attached fastener elements into frame 10 at the time portions 12 and 14 are secured together. It will be understood, however, that the invention is not limited to this type of fastener or fastener mounting means. Each fastener 32 is adapted to extend through one of apertures 36 in lens blank 20 and thus lock it securely but removably within the goggle frame.

Ventilating means for the goggles of the invention are shown particularly in Figs. 1, 4, 5 and 7. Frame elements 12 and 14 are formed in the inner portion of their adjacent faces with a plurality of similarly positioned slots 40. Lens blank 20 is similarly provided with a plurality of peripheral apertures 42, each adapted to coincide with one of slots 40. As shown particularly in Figs. 5 and 7, this arrangement provides for adequate circulation of air through the coinciding slots and apertures of frame and lens respectively. It is to be understood, however, that the invention is in no way limited to this arrangement, and that any other suitable ventilating means may be employed without departing from within the scope of the invention.

It will be apparent from the foregoing that with the goggle of the invention the lens may quickly and easily be changed if damaged, or exchanged if desired for a lens of different optical properties. It is proposed, for example, to equip each goggle frame with a clear lens, a light-polarizing lens and a lens of low light transmission, such for example as a dark red lens of the type worn by night airplane pilots during daylight hours to precondition their eyes for night flying. Under some conditions, however, the user of the goggle might prefer simply to superimpose an additional lens blank of different optical properties over the lens already mounted in his goggles. Provision for this is made in accordance with the invention, and is illustrated diagrammatically particularly in Figs. 5 and 7.

In accordance with this embodiment of the invention, an additional lens blank of the configuration shown in Fig. 4 may be superimposed on the front of goggle frame 10 and held in position as indicated at 44 in Figs. 5 and 7 by simply slipping straps 25 within T-slots 22. The pressure of the straps 25 against the ends of the auxiliary lens will be found to hold it in position with adequate firmness. In order to provide space for ventilation between such an auxiliary lens and the main lens of the goggle, frame portion 12 is provided as shown with a plurality of outwardly projecting ribs 45 which serve to hold lens blank 44 in spaced relation with the front of frame portion 12 and thus permit circulation of air therebetween.

Other similar modifications of the invention will doubtless be apparent to those skilled in the art, and are to be construed as coming within the scope thereof.

It will be appreciated that the above described embodiment of the goggle of the invention possesses numerous structural and other advantages. In particular, it eliminates the effect known as "tunnel vision" resulting from conventional goggle structure where the lens is formed in two portions, and the single viewing aperture gives the wearer substantially improved binocular vision over goggles of conventional structure. It is cheaper and simpler to manufacture, both with respect to the frame and the lens, in view of the latter's being formed preferably of a single piece. It is to be understood, however, that the invention is not limited to any of the specific details described hereinabove. In particular, it will be noted that the body of the goggle frame may be formed in other ways than that described as preferred. For example, it may be formed in a single piece from relatively rigid rubber of the desired resiliency, or sponge rubber may be substituted in the portion shown in the drawings as formed of relatively rigid rubber. It is to be understood, therefore, that such modifications of the goggle structure described, particularly with respect to changes in the material and arrangement thereof, are to be construed as coming within the scope of the invention.

It is also to be understood that the following claims are intended to cover all the generic and specific features of the invention herein described, and all statements of the scope of the invention which, as a matter of language, might be said to fall therebetween.

What is claimed is:

1. Goggles comprising, in combination, lens means comprising a sheet-like blank of light-transmitting plastic material, said blank being formed to provide a pair of lens portions of substantial area connected by a portion of reduced area adapted to accommodate the nose of the wearer, a frame portion comprising a substantially continuous strip of relatively elastic material adapted to coincide with the periphery of said sheet, said frame being adapted along its rearward edge to engage and substantially conform with the face of the wearer, means for mounting said lens blank within said frame, and means for holding said goggles in position before the eyes of a wearer, said last named means comprising strap means, said lens blank being provided with open T-slots adjacent the ends thereof adapted to receive said strap means, said strap means being provided adjacent the ends thereof with bead means adapted to prevent withdrawal of said strap means from said T-slots, an auxiliary lens shaped to overlie the sheet-like blank and having slotted ends through which the strap means is threaded and ventilation means between said auxiliary lens and blank.

2. Goggles comprising, in combination, lens means comprising a sheet-like blank of light-transmitting plastic material, said blank being formed to provide a pair of lens portions of substantial area connected by a portion of reduced area adapted to accommodate the nose of the wearer, a frame portion comprising a substantially continuous strip of relatively elastic material adapted to coincide with the periphery of said sheet, said frame being adapted along its rearward edge to engage and substantially conform with the face of the wearer and having spaced projections on its front face forwardly of the blank when said blank is positioned therein, means for mounting said lens blank within said frame, a supplemental lens blank similar in configuration to but of different optical properties from said first named lens blank engaging the spaced projections in substantial alignment with the first named blank, and means for removably securing said supplemental lens blank to said frame in substantially superimposed and parallel relation with said first named lens blank.

3. Goggles comprising, in combination, lens means comprising a sheet-like blank of light-transmitting plastic material, said blank being formed to provide a pair of lens portions of substantial area connected by a portion of reduced area adapted to accommodate the nose of the wearer, a frame portion comprising a substantially continuous strip of relatively elastic material adapted to coincide with the periphery of said sheet, said frame being adapted along its rearward edge to engage and substantially conform with the face of the wearer, means for mounting said lens blank within said frame, a supplemental lens blank similar in configuration to but of different optical properties from said first named lens blank, means for securing said second named lens blank to the front of said frame in substantially superimposed and parallel relation with said first named lens blank, and means for ventilating the space between said lens blanks, said last named means comprising a plurality of outwardly projecting ribs on said frame adapted to hold said second named lens blank in spaced relation with the portions of the front of said frame between said ribs.

4. Goggles comprising, in combination, lens means comprising a sheet-like blank of light-transmitting plastic material, said blank being formed to provide a pair of lens portions of substantial area connected by a portion of reduced area adapted to accommodate the nose of the wearer, a frame portion comprising a substantially continuous strip of relatively elastic material adapted to coincide with the periphery of said sheet, said frame being adapted along its rearward edge to engage and substantially conform with the face of the wearer, means for mounting said lens blank within said frame, strap means for holding said goggles in position before the eyes of a wearer, a supplemental lens blank similar in configuration to said first named lens blank, said second named lens blank being provided with open T-slots adjacent the ends thereof, said strap means being adapted to engage said slots and thereby removably secure said second named lens blank to said frame in substantially superimposed and parallel relation with said first named lens blank.

5. Goggles comprising, in combination, lens means comprising a sheet-like blank of light-transmitting plastic material, said blank being formed to provide a pair of lens portions of substantial area connected by a portion of reduced area adapted to accommodate the nose of the wearer, a frame portion comprising a substantially continuous strip of relatively elastic material adapted to coincide with the periphery of said sheet, said frame being adapted along its rearward edge to engage and substantially conform with the face of the wearer and having spaced protrusions on the front face thereof forwardly of the blank when said blank is in position therein, means for mounting said lens blank within said frame, a supplemental lens blank similar in configuration to but of different optical properties from said first named lens blank engaging the spaced protrusions, and means for removably securing said second named lens blank to said frame in substantially superimposed and parallel relation with said first named lens blank, one of said lens blanks comprising light-polarizing material.

6. A device of the character described comprising sheet material shaped to provide a pair of lens portions of substantial area connected by a portion of reduced area shaped to fit about the nose of an individual, a facepiece shaped to fit about the contour of the sheet material and having holding means for supporting said sheet material, auxiliary lens means shaped substantially to the same shape as the lens portions and supported in alignment with said lens portions and spacer means in spaced relation with each other between said lens portions and said auxiliary lens means for retaining them in spaced relation with each other with the space between said spacer means providing open air passageways for ventilation means.

7. Goggles comprising a single aperture goggles frame, said frame comprising a semi-flexible front rim and a soft, face-fitting rear rim moulded thereto along its outer edge, a lens receiving channel formed between the front and rear rims along the lens aperture edge, a readily removable lens securable within said lens channel, lens securing means within said lens channel, said lens securing means comprising a plurality of lens penetrating members therein, said lens being provided with a plurality of suitably located cooperating apertures.

8. Goggles comprising a single aperture goggle frame, said frame comprising a flexible front rim and having a lens receiving channel formed therein along the lens aperture edge with the front wall of said channel constituted by a part of said flexible front rim, a readily removable lens securable within said lens channel, lens securing means within said lens channel, said lens securing means comprising a plurality of lens penetrating members therein, said lens being provided with a plurality of suitably located cooperating apertures.

9. Goggles comprising a single aperture goggles frame, said frame comprising a semi-flexible front rim and a softer, face-fitting rear rim molded thereto along its outer edge, a lens receiving channel formed between the front and rear rims along the lens aperture edge, a readily removable flexible lens securable within said lens channel, and lens securing means within said channel.

WALTER LOWN.
CHARLES A. BARATELLI.